June 4, 1957     E. B. WIST ET AL     2,794,407

LIQUID DISTRIBUTOR FOR AGRICULTURAL VEHICLES

Filed Oct. 26, 1953

INVENTORS:
EDWARD B. WIST
THAXTER H. ANDRUSS
BY: Oswald H. Milmore
THEIR ATTORNEY

United States Patent Office 2,794,407
Patented June 4, 1957

2,794,407

LIQUID DISTRIBUTOR FOR AGRICULTURAL VEHICLES

Edward B. Wist, Orinda, and Thaxter H. Andruss, Oakland, Calif., assignors to Shell Development Company, New York, N. Y., a corporation of Delaware Application October 26, 1953, Serial No. 388,377

6 Claims. (Cl. 111—7)

The invention relates to devices mounted on agricultural vehicles for distributing liquid at controlled rates among a plurality of delivery points that may be situated above, on, or beneath the ground surface. Although not limited thereto, the invention finds especial application for sub-soil injection of various liquids, such as biocides, liquid fertilizers, etc. For example, when planting seeds with a vehicle having a plurality of planter shoes that form furrows in the ground, it is often desirable to treat the soil in the vicinity of the planted seeds with a biocide to effect partial sterilization of the soil for destroying or controlling various undesired organisms, such as fungi, nematodes, etc.; the apparatus according to the invention can be applied to supply liquid in controlled quantities to each of these seed furrows.

Such liquids are often expensive and/or phytotoxic and the rate of application thereof must be carefully controlled, not only to provide a uniform rate in relation to the travel of the vehicle and to effect cessation of flow when the vehicle is stopped, but also to cause the several delivery points to receive liquid at equal or proportional rates. Simple closed manifolds have been found to be subject to the drawback that the head for the flow of liquid to the several delivery points is subject to change due to changes in the lateral inclination of the vehicle, whereby outlets at the lower side receive a proportionately greater flow of liquid. Also, when using certain simple liquid metering devices appropriate to agricultural work, such as orifice restrictions or centrifugal or positive displacement pumps drivingly connected to the vehicle and having clearances that permit liquid flow, liquid is apt to seep through the metering device when the vehicle is stopped. In closed systems the siphoning action or drainage of liquid from the ducts may result in considerable discharge of liquid at one locality on the ground.

It is an object of this invention to provide an improved apparatus for distributing liquid to a plurality of outlets that is simple and that effectively distributes the liquid despite changes in the relative elevations of the delivery points.

It is a further object to provide a liquid distributor adapted for use on agricultural vehicles including a supply reservoir and a metering device connected in the main outlet line from the reservoir or in each of the branched outlets, such as an orifice or a centrifugal or positive displacement pump that may have clearances and is driven to operate in accordance with the movement of the vehicle, wherein siphoning and undesired flow of liquid are effectively prevented when the vehicle is stopped, without the need of providing shut-off valves in each of the several outlets.

Further objects will become apparent from the following description.

In summary, the apparatus according to the invention comprises a reservoir, a liquid-distributor connected to said reservoir and adapted to discharge liquid through a plurality of distributor outlets in regulated amounts, a vented chamber, e. g., an overflow device, for each of the distributor outlets, and a low-pressure outlet for each of said chambers through which liquid flows to the respective delivery points. The effective liquid head inducing flow in the several streams is the difference between the hydrostatic head at the reservoir and the elevation of the vented chamber, plus the head, if any, due to the distributor, e. g., a negative head imposed by an orifice or a controlled leak device or a positive head due to a pump. This head is independent of the position of the liquid-delivery device, such as a nozzle or applicator, and it becomes possible to mount these at different levels on the vehicle. Moreover, when the vehicle is to be operated on uneven ground, at which canting of the vehicle changes the relative heights of the discharge devices, the effective liquid head can be held more nearly uniform among the several liquid-delivery devices connected to the outlets of the vented chambers by locating the said vented chambers in close proximity to one another on the vehicle, whereby canting of the vehicle causes only negligible elevational differences among the chambers. In the preferred embodiment, wherein the liquid is metered by means of a pump driven by the vehicle wheel, the vented chamber is advantageously mounted at a height above the hydrostatic head of the reservoir, so that no liquid will flow when the pump is out of operation.

The invention will be further described by reference to the accompanying drawing forming a part of this specification and illustrating one specific embodiment by way of example, wherein.

Figure 1:
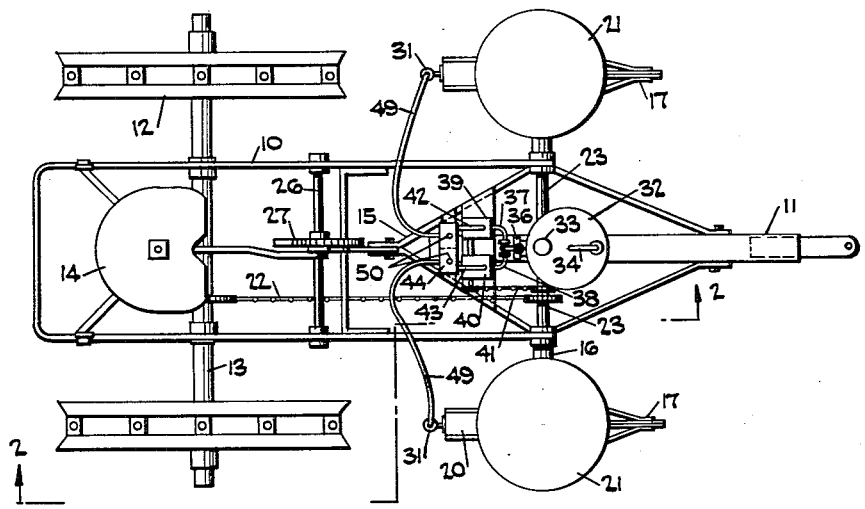
Figure 1 is a plan view of a vehicle adapted for planting seeds and equipped with the liquid distributor according to the invention.
Figure 2:
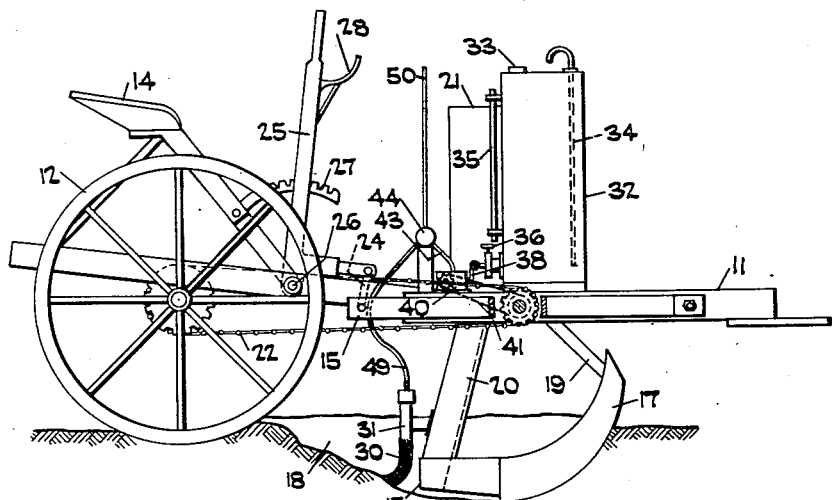
Figure 2 is a side elevation of the vehicle, showing it in operation.

Referring to the drawings in detail, the vehicle shown comprises a frame 10 having a draft tongue 11, wheels 12 on an axle 13, and a seat 14. The draft tongue is pivotally connected to the frame by a horizontal axle 16. The vehicle may have a plurality of any number, e. g., two seed planting devices pivotally mounted on a tiltable frame 15 that is rigid to the draft tongue. Each planting device includes a planter shoe 17 that is adapted to form a furrow 18 in the ground when the vehicle is moved and is fixed to the tiltable frame 15 by front and rear bars 19 and 20. The latter bar is hollow and communicates at its lower open end with an opening 17a in the rear part of the shoe, so that seeds can issue and fall into the furrow. The upper end of the hollow bar 20 communicates with a seed hopper 21, also mounted on the tiltable frame and provided with suitable means for controlling the discharge of seeds therefrom, such as a rotatable feed member (not shown) driven from the vehicle wheel by a sprocket chain 22 and a shaft 23 that is rotatable within the axles 16. The frame is connected by a pivoted link 24 to the horizontal part of an operating lever 25 that is pivotally mounted on the vehicle frame by a transverse shaft 26, whereby the inclination of the draft tongue and tiltable frame 15 with respect to the frame 10 can be adjusted. When the front end of the tongue 11 is held at a fixed height above the ground by the coupling device of a tractor or other towing vehicle the depth to which the planter shoe 17 penetrates the ground is determined by this inclination. The lever 25 can be locked in any desired position by means of an arcuate rack plate 27 carried by the frame 10 and a pawl which is mounted on the lever and controlled by a handle 28. The parts described so far are well known and form no part of the invention; they may be embodied in other arrangements.

To apply liquid, e. g., liquid biocide, to the soil in the furrow behind the planter shoe any suitable liquid-delivery device, such as a brush applicator, is mounted on each bar 20. In the embodiment shown the applicator is a brush including bristles 30 fixed about the periphery of an open-ended tube 31 and positioned to wipe the soil.

Figure 3:
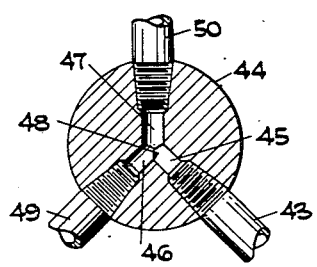
Figure 3 is a sectional view through a vented chamber, shown on an enlarged scale.

The liquid supply and distributing system includes a reservoir 32 mounted on the tiltable frame and having a filling opening in the top that can be closed by a closure 33. While not in every case essential, it is advantageous with many types of feed pumps to supply liquid from the reservoir at a constant head; for this purpose the closure 33 and top of the reservoir are sealed and an air inlet tube 34, open at both ends, is fitted to establish communication between the atmosphere above the reservoir and the inside, lower part of the reservoir. It is evident that after a small amount of liquid has been withdrawn the pressure at the bottom of the tube 34 is always atmospheric and that air enters through the tube as the contents of the reservoir are depleted. In other words, the hydrostatic head of the reservoir is normally at the level of the bottom of the tube 34. The reservoir may be provided with a sight glass 35 and has an outlet at the bottom that may be provided with a shut-off valve 36. The outlet communicates by branch pipes 37 and 38 to feed pumps of any suitable type, e. g., gear pumps 39 and 40, that are driven at a common speed by a sprocket chain 41 from the shaft 23. The pump inlets are preferably below the bottom of the tube 34, so that they are supplied with liquid under positive hydrostatic head. These pumps serve as liquid metering devices for inducing flow through the several branch pipes in a predetermined, e. g., equal ratio, and may have slip, so that the flow of liquid is influenced by the flow resistance in the pipes and by imposed heads. The distributor discharge outlets, i. e., the outlets from the pumps, are connected by riser ducts 42 and 43 to separate vented chambers formed in a housing 44. The latter may be a single metal block having, for each chamber, three bores 45, 46 and 47 (Figure 3) situated in a common vertical plane and intersecting at the center so as to constitute the chamber and form an overflow weir 48. Similar groups of three bores are formed along the horizontal axis of the block. Each of the riser ducts 42, 43, is connected to a separate bore 45, which constitutes the inlet passage. Each bore 46 constitutes a low-pressure outlet and is connected to a duct 49 connected to a separated delivery device, viz., a brush applicator 30. The third bore 47 is a vent open to the atmosphere; it may optionally be provided with a standpipe 50 extending preferably to the highest level to which the reservoir is filled as a precaution against spillage of liquid due to surging or in the event that the tube 49 is stopped up, particularly when a hazardous liquid is handled. The upper ends of the tubes 50 are thus above the level of the highest hydrostatic head that can be developed in the reservoir when the closure 33 is removed.

It is evident that by this construction the three bores of each vented chamber occupy but little lateral space, and it is possible to locate the several groups of bores in close proximity while isolating the several chambers, so that the canting of the vehicle will have but slight effect on the relative elevations of the overflow weirs 48 with respect to the bottom of the tube 34. By maintaining these relative elevations constant the quantities of liquid that flow through the several branches will likewise remain constant provided the passages for the several streams between the valve 36 and the several weirs 48 have like hydraulic characteristics and the pumps have identical head-flow characteristics. This makes it possible to use pumps with considerable slip, e. g., gear pumps that have considerable clearances, so that they are not true positive displacement pumps, as well as centrifugal pumps. The lengths of the ducts 49 do not influence the flow rates, provided, of course, they are made large enough to permit all liquid delivered to the vented chambers to flow over the weirs 48 and down the ducts by gravity. Further, it is impossible for siphoning to occur. When the vehicle and the pumps 39 and 40 are stopped the flow of liquid into the vented chambers and over the weirs 48 ceases immediately because the said weirs are at levels above the hydrostatic head of the reservoir, even if the pumps have considerable slip.

The system described is suitable to a wide variety of applications and is, of course, not restricted to use in combination with a seed planter shoe. It is suited to delivering liquid in well regulated quantities at a wide range of flow rates, down to such small amounts as 0.02 milliliter of liquid per linear foot of furrow.

We claim as our invention:

1. Apparatus for distributing liquid among a plurality of liquid delivery devices comprising, in combination: a reservoir for said liquid adapted to supply liquid at a restricted hydrostatic head; a liquid-distributing device including pump means having the intake thereof connected to receive liquid from said reservoir and having a plurality of distributor outlets and means for distributing liquid among said outlets in a predetermined proportion; a chambered weir box having a separate chamber for each said distributor outlet, each said chamber having an inlet connected to a different one of said distributor outlets, a vent open to the atmosphere, a low-pressure outlet, and an overflow weir between said inlet and outlet, each said weir being situated at a level above the said hydrostatic head of the reservoir; and a liquid-delivery device for each of said chambers situated at a lower level than and connected to receive liquid from the low-pressure outlet thereof.

2. The apparatus according to claim 1 wherein said liquid distributing device includes a separate feed pump for each of said distributor outlets, said pumps being interconnected to operate at speeds that have a predetermined relation to each other.

3. The apparatus according to claim 2 wherein said pumps are of the type having slip, whereby liquid can seep through the pumps while they are out of operation.

4. An agricultural vehicle having a reservoir for liquid; a liquid-distributing device including pump means having the intake thereof connected to said reservoir, a plurality of outlets to said distributing device and means for metering the flow of liquid through each of said outlets, said metering means being of the type wherein the liquid flow rates are further influenced by the flow resistance of the flow passages; a separate weir chamber connected to each of said pump outlets, an overflow weir in each separate weir chamber, each said weir being at a level above the hydrostatic head of the reservoir; said chambers being situated in close proximity to each other so that the relative elevations of said weirs are altered only to a negligible extent by inclinations of the vehicle; a plurality of liquid-dispensing devices on said vehicle situated at levels below said weirs and spaced apart by a distance in excess of the distance between said weirs and a separate down duct for each said dispensing device connecting the respective device to a separate weir chamber.

5. An agricultural vehicle according to claim 4 wherein said weir chambers have vents open to the atmosphere and said down-ducts and dispensing devices are of high capacity adapted to discharge liquid admitted into their respective weir chambers without back-up of liquid in the down-ducts.

6. An agricultural vehicle having a wheel adapted to roll on the ground; a plurality of laterally spaced furrow-opening tools mounted on said vehicle in laterally spaced relation; a closed reservoir on said vehicle adapted to contain a liquid and having an outlet; means associated with said reservoir for restricting the hydrostatic head at which liquid is delivered by said reservoir at the said outlet; a liquid-distributing device including a plurality of pumps, each pump having the inlet thereof connected to receive liquid from said reservoir outlet at a level beneath the said hydrostatic head of the reservoir outlet; means for driving said pumps in unison from said wheel; a weir chamber for each pump, each said chamber including an inlet connected to the discharge of a separate pump, a vent open to the atmosphere, a low-pressure outlet, and a weir between said inlet and outlet, said chambers being mounted on said vehicle with the weirs thereof at a level above the said hydrostatic head of the reservoir outlet and in close proximity to each other; a standpipe for each said vents extending to a height above the maximum level of liquid in said reservoir; a liquid-dispensing device mounted on the vehicle adjacent to each of said furrow-opening tools and positioned with respect thereto to discharge liquid into the furrows made by said tools; and a separate down-duct for each dispensing device connecting the respective dispensing device to the low-pressure outlet of a separate weir chamber.

References Cited in the file of this patent

UNITED STATES PATENTS

| | | |
|---|---|---|
| 409,973 | Johnson | Aug. 27, 1889 |
| 863,666 | Croix | Aug. 20, 1907 |
| 1,983,165 | Cameron | Dec. 4, 1934 |
| 2,047,414 | Henry et al. | July 14, 1936 |

FOREIGN PATENTS

| | | |
|---|---|---|
| 144,504 | France | Aug. 12, 1881 |
| 160,447 | France | Feb. 21, 1884 |
| 411,180 | Germany | Mar. 16, 1925 |